United States Patent [19]

Hug et al.

[11] 4,112,202
[45] Sep. 5, 1978

[54] SPIRALLY WOUND ELECTROCHEMICAL CELL AND METHOD AND APPARATUS FOR ITS PRODUCTION

[75] Inventors: Leonard F. Hug, Wheatridge; Donald H. McClelland, Littleton; Toshio Uba, Denver, all of Colo.

[73] Assignee: The Gates Rubber Company, Denver, Colo.

[21] Appl. No.: 810,336

[22] Filed: Jun. 27, 1977

Related U.S. Application Data

[62] Division of Ser. No. 733,674, Oct. 18, 1976, Pat. No. 4,064,725.

[51] Int. Cl.² .................................. H01M 6/10
[52] U.S. Cl. .................................................... 429/94
[58] Field of Search .......................... 429/94, 209, 211

[56] References Cited

U.S. PATENT DOCUMENTS

| 2,954,417 | 9/1960 | Lehovec et al. | 429/94 |
| 3,298,871 | 1/1967 | Binder et al. | 429/94 |
| 3,364,069 | 1/1968 | Deschamps | 429/94 X |
| 3,373,060 | 3/1968 | Gray | 429/94 |
| 3,565,690 | 2/1971 | DuPlessix et al. | 429/94 |
| 3,862,861 | 1/1975 | McClelland et al. | 429/94 X |
| 3,900,340 | 8/1975 | Greaser et al. | 429/94 |
| 4,000,351 | 12/1976 | Hug et al. | 429/94 |

*Primary Examiner*—Anthony Skapars
*Attorney, Agent, or Firm*—Curtis H. Castleman, Jr.; Raymond Fink; H. W. Oberg, Jr.

[57] ABSTRACT

A spirally wound element comprising opposite polarity plates and interleaved separator is described, for use in electrochemical cylindrically configured cells. The cell pack has a uniform predetermined cross section irrespective of variation in component thicknesses as long as such thicknesses are within specified tolerances. A dual head, belt-driven winder and method are also described for producing the spiral cell pack.

9 Claims, 9 Drawing Figures

SPIRALLY WOUND ELECTROCHEMICAL CELL AND METHOD AND APPARATUS FOR ITS PRODUCTION

This is a division of application Ser. No. 733,674, filed Oct. 18, 1976 now U.S. Pat. No. 4,064,725.

BACKGROUND OF THE INVENTION

This invention relates to spirally wound electrochemical cell components and method and apparatus for their production, and more particularly relates to the production of geometrically uniform spiral cell packs accommodating dimensional variations in components, where at least one of the components is readily compressible.

Various techniques for spirally winding electrochemical cells into a generally cylindrical ("jelly roll") configuration are known, and include the driven mandrel type (e.g., U.S. Pat. No. 3,298,871 to Binder et al), the driven mandrel and idling pressure roll type (e.g., U.S. Pat. No. 1,269,778 to Becker and U.S. Pat. No. 3,839,088 to Hug et al). The use of a single endless belt serpentined about a series of rollers, for instance of the general type shown in U.S. Pat. No. 171,346 to Broas, has also been used to spirally wind electrochemical cell packs; a weight tensioning device is attached to one of the rollers to produce a cell pack of uniform mutual stacking pressure between the components.

While the aforementioned types of spiral winders have their benefits in particular applications, one disadvantage prevalent with each of the above types is that the resultant cross-sectional geometrical configuration of the cell pack will vary significantly with relatively small variance in component (i.e., plate and separator) thicknesses. The obvious practical problems resulting from these inconsistent geometrical cross sections is that the outside diameter of the "cylindrical" cell pack is oftentimes too large for the cylindrical container in which it is to be stuffed, or alternately is too loose to snugly fit into such container. As a result, the scrap rate for such spirally wound elements may become unbearably high, or it may become necessary to maintain very close tolerance control over incoming components, resulting in increased production costs.

Another important criteria for a spiral winder is that it provide for limited differential slip between the plate and separator components during winding. As the components are being wound upon themselves the outermost components are normally placed in tension, while the inwardly adjacent component is following a winding curvature defined by a smaller radius than the outermost component and will therefore be put either into compression or relatively less tension than the outermost component. Particularly where fragile or dimensionally unstable components are being wound, the inability of the components to slip one with respect to another may result in separator stretching or tearing, the separator folding back upon itself, and/or the plates folding back upon themselves. It is known that any of the just described phenomena can lead to premature cell failure due to internal shorting, particularly in rechargeable cells which experience plate growth during cycling.

The aforementioned problems which develop when there is improper relative slip between the components is accentuated when the separators are made of a material which is extremely fragile and difficult to handle, such as nonwoven ultra fine mats of fiber glass or other high heat of wetting material. The problem may become particularly critical when employing plates utilizing soft and pliable substrates onto which is affixed a sticky or tacky paste material which may become physically bonded to the separator strips in advance of the point of wind, and therefore preclude relative slipping during wind.

It is a primary object of the subject invention to overcome the prior mentioned problems; to provide a wound cell element having a very uniform cross-sectional geometry even through the components may vary substantially in thicknesses; to provide a wound element in which the components are in alignment with respect to each other; to provide a wound element in which the pasted surfaces of the cell plates are not marred, scratched, allowed to crack, or otherwise damaged during winding; to provide a winding process in which the separators and plates are permitted to slip relative to one another during winding while maintaining proper winding pressure; and to provide a winding apparatus to meet the aforementioned and other objects of the invention.

SUMMARY OF THE INVENTION

Briefly described, in one spect there is provided a spirally wound electrochemical cell including flexible positive and negative plates of given lengths and given thicknesses within specified tolerances, and a compressible separator interleaved between the plates and also of a given length and of a given thickness within a specified tolerance, the positive and negative plates and interleaves separator being spirally wound together to form a generally cylindrical cell pack subassembly. The cylindrical cell pack, as measured across its outside (greatest) diameter or diametrically across its cross-section along any other particular "diameter," has a substantially predetermined desired dimension irrespective of the individual thickness of the plates and separator, provided such thicknesses are within the specified tolerances.

In another aspect, the method for spirally winding electrode plates and separators into a generally cylindrical cell pack subassembly for inclusion in an electrochemical cell, includes the steps of (1) disposing in juxtaposition first and second retractable winding heads each carrying a flexible driving surface for winding the electrode plates and separators into spiral form; (2) positioning a mandrel intermediate the winding heads and opposite each of the flexible driving surfaces; (3) feeding a leading edge of one of the electrode plates, adjacent which is disposed at least one separator layer, in between the mandrel and the flexible driving surface of the first winding head; (4) feeding a leading edge of the other electrode plate, adjacent which is disposed at least one separator layer, in between the mandrel and the flexible driving surface of the second winding head; (5) locking the winding heads into winding position by advancing the winding heads toward one another thereby sandwiching the plates and separators between each of the flexible driving surfaces and mandrel; and (6) driving at least one of the driving surfaces while simultaneously retracting the winding heads away from one another whereby the spirally wound cell pack is formed.

In still another aspect, the apparatus for spirally winding electrode plates and interleaved separators into a generally cylindrical form includes: first and second retractable juxtaposed winding heads having flexible driving surfaces; means for advancing and retracting the winding heads relative to each other; a free turning mandrel positioned between the flexible driving surfaces; means for feeding a leading edge of one of the electrode plates flanked on at least one of its sides with separator material in between the mandrel and the flexible driving surface of the first winding head; means for feeding a leading edge of the other electrode plate flanked on at least one of its sides with separator material in between the mandrel and the flexible driving surface of the second winding head; and means for driving at least one of the driving surfaces about the winding head to spirally wind the electrode plates and separators.

In a further aspect, the invention pertains to a winding mandrel facilitating spirally winding cells according to the invention. The mandrel cross section is compressed of a pair of oppositely disposed inwardly notched lands for receiving the leading edges of the cell pack to be wound, from which project juxtaposed major edge surfaces of the mandrel each defined by a generally spiralled curvature.

BRIEF DESCRIPTION OF THE DRAWINGS

The invention will be more particularly described in certain of its preferred embodiments by reference to the accompanying drawings, wherein like numerals designate like parts, and in which:

FIG. 6 is a partial view taken along line 6—6 of FIG. 2;

PREFERRED EMBODIMENTS OF THE INVENTION

The invention will be described in conjunction with the manufacture of spirally wound cell packs (i.e., subassemblies) of the lead-acid rechargeable type generally shown in U.S. Pat. No. 3,862,861 to McClelland et al. However, the invention is not so limited and broadly applies to spirally wound cell packs for use in various types of electrochemical cells.

(1) The Cell Subassembly

Figures 3, 7:
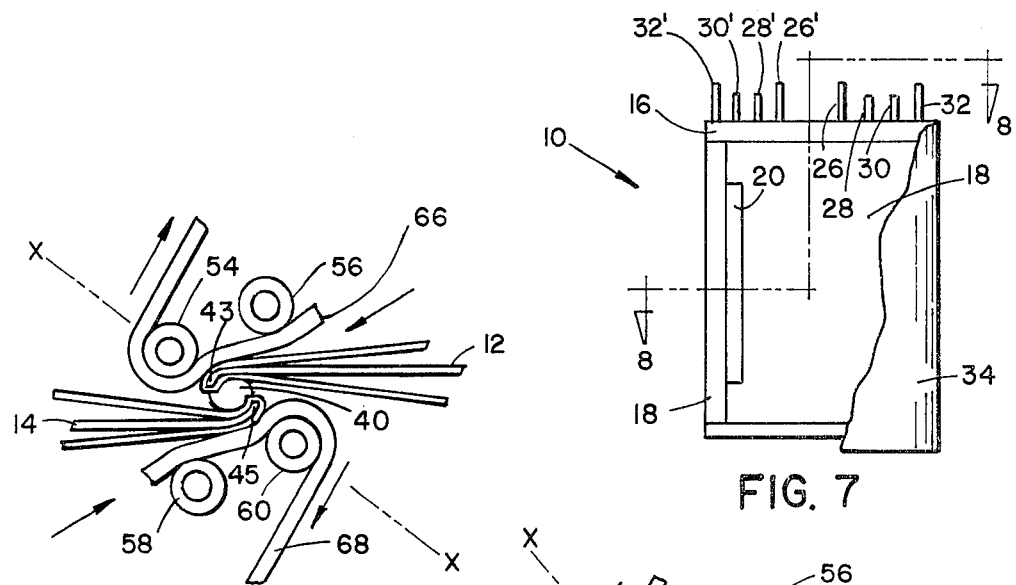
FIG. 3 is an enlarged view of the ends of the winding heads, mandrel and cell components in position just prior to winding.
FIG. 7 is a side view of a wound subassembly in association with a container shown broken away.
Figures 4, 8:
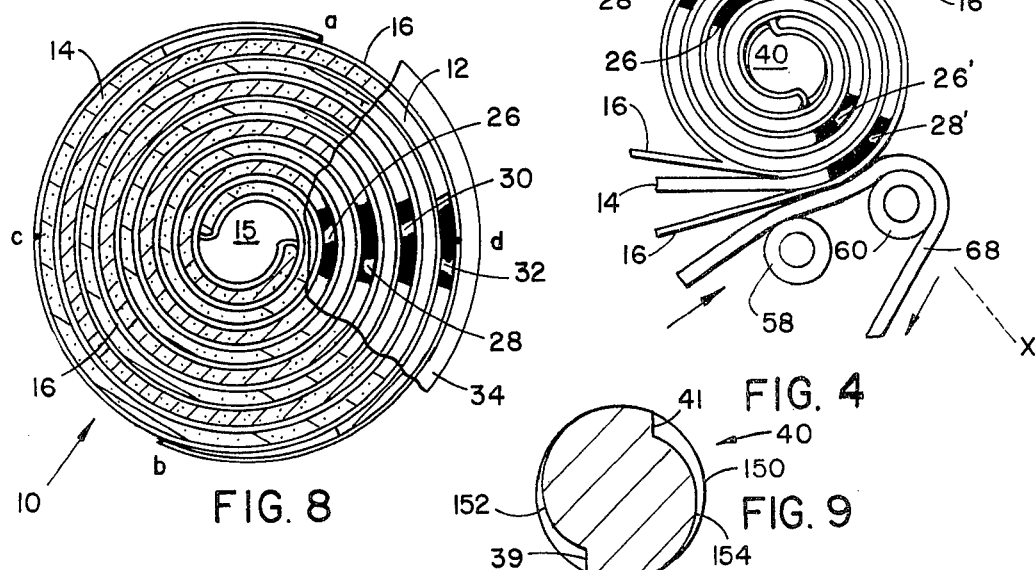
FIG. 4 is a view similar to FIG. 3 showing the cell components having been partially wound.
FIG. 8 is a horizontal partial cross-sectional view, taken generally along section 8—8 of FIG. 7, of the finished wound subassembly of plates and separators produced with the winder of the invention.

The electrochemical cell subassembly and its components are shown generally at 10 in FIGS. 7 and 8 and comprise a flexible positive plate 12, a negative plate 14 and interleaved, compressible separator member 16. These components are formed in a jelly-roll (spiral) configuration under a suitable winding tension, and are retained in this mutual compressive relationship by a tail member 18 (shown in FIG. 7) which is wrapped circumferentially about the cell subassembly and adheres onto itself with the aid of binder 20 to constrict the wound element to its generally cylindrical configuration. The tail material is generally of greater strength and much thinner than the adjacent separator 16. The binder or adhesive 20 may be provided by suitable double-backed tape, for instance.

Figure 5:
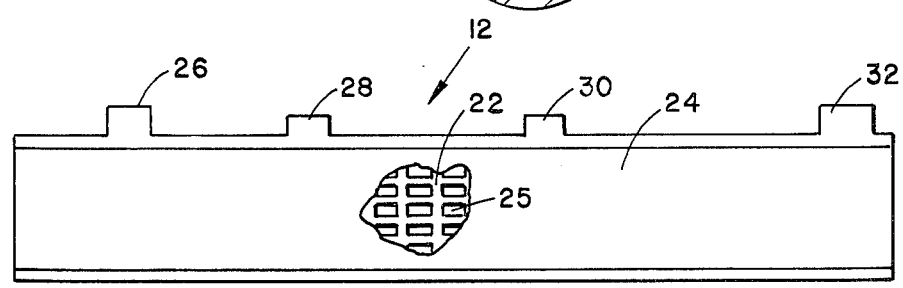
FIG. 5 is a side, partial cutaway view of a representative electrode plate which is being wound by the winding apparatus of the invention.

Each of the electrode plates may have the configuration shown in FIG. 5, which includes a grid substrate 22, which may be in perforated form, expanded mesh, woven wire screen or other suitable substrate, onto which is present a uniform layer 24 of electrochemically active paste such as lead oxide. The paste forms a surface layer on either side of the grid as well as impregnating the interstices 25 in the grid substrate.

The plate also carries a plurality of spaced radially aligned positive current collector tabs 26, 28, 30, 32 and negative tabs 26', 28', 30' and 31'. As will be seen from the wound element of FIG. 7, in one embodiment employing at least three tabs, the radially innermost positive tab 26, and radially outermost tab 32 protrude axially upwardly beyond the intermediate tabs 28, 30. This difference in tab length has been found to be beneficial when welding such tabs to an associated terminal post, such as when employing the method and apparatus disclosed in U.S. Pat. No. 3,873,803 to Young et al, hereby incorporated by reference. In the method of that patent, a lead post leg (not shown here) is inserted in between tabs 28 and 30, and each of tabs 30 and 32 are positioned adjacent one side of such lead post, and similarly tabs 26 and 28 are positioned adjacent the other side of the lead post. The tabs are then welded to the post using the mold puddling technique taught in that patent. With the outermost tabs 26, 32 extending beyond the inner tabs 28, 30, the ends of all of the tabs in the ready-to-weld position are generally coterminous, thereby enabling an improved positive unitary weld joining all of the tabs and post leg together and producing a weld of reduced internal impedance. The amount of extension of the outer tabs will be determined by the height of the lead post leg and lateral spacing between tabs.

Alternatively, the tabs may be of generally even height for performance of the method and use of the winding apparatus of the invention. It is preferred in this embodiment to employ at least two tabs per plate, three or four being more preferred.

Referring to FIG. 8 an important feature of the cell of the invention is that the wound element 10 has an extremely uniform cross-sectional geometry. Specifically, the spiral or cylindrical cell pack, as measured along its greatest ("outside") diameter, or in general, diametrically across any particular "diameter", such as diameter $ab$, or diameter $cd$, for instance, has a predetermined dimension (within very small tolerances generally varying less than about plus or minus one percent from the nominal diameter) irrespective of the individual thickness of the positive and negative plates and separator, as long as such thicknesses are within certain specified tolerances and the lengths of the plates and separators are substantially fixed. In essence, the invention describes a cylindrical cell having a predetermined cross-sectional geometry shape and constant outside diameter (within the above specified tolerances) even though the individual positive and negative plates taken together with the separators associated with each of the plates, have a combined (uncompressed) thickness within plus or minus up to about 3 percent of its given nominal design (uncompressed) thickness.

As will also be appreciated, the foregoing is true only if the separator thickness is capable of being compressed at least as much as the plates are oversized (compared to design). In comparison, conventional spiral cell packs, to Applicants' knowledge, could not be produced having an outside diameter within plus or minus about one percent of the nominal diameter without maintaining very tight control over the combined uncompressed thickness of the positive and negative plates and the two adjacent associated separators to be wound. Achievement of this predetermined cross-sectional geometry stems from the compressibility of the separator element to compensate for variances in component thicknesses, and the manner in which the cell is wound. Hereafter will be described a method for obtaining this desired spiral configuration, which will provide for repeatedly uniform wound elements. An obvious advantage of having a cell pack of uniform dimension is that it may be properly fitted within an outer container (only a portion of which is shown at 34).

As discussed more fully in the aforementioned U.S. Pat. No. 3,862,861, the spirally wound element 10, if ear-marked for use in a lead-acid cell, may be sealed in a suitable acid resistant container 34, which may be made of polypropylene, for instance, and then further stuffed into a meal container (not shown) for shock resistance. Connection of the positive and negative electrode tabs to their appropriate lead posts and connection of the posts to the opposite polarity terminals of the cell may be done in any desired manner. The steps remaining to make the cell ready for use, including acid addition and formation, are well known to those skilled in the art and do not form a part of the invention herein claimed.

(2) Winding Apparatus

Figure 1:
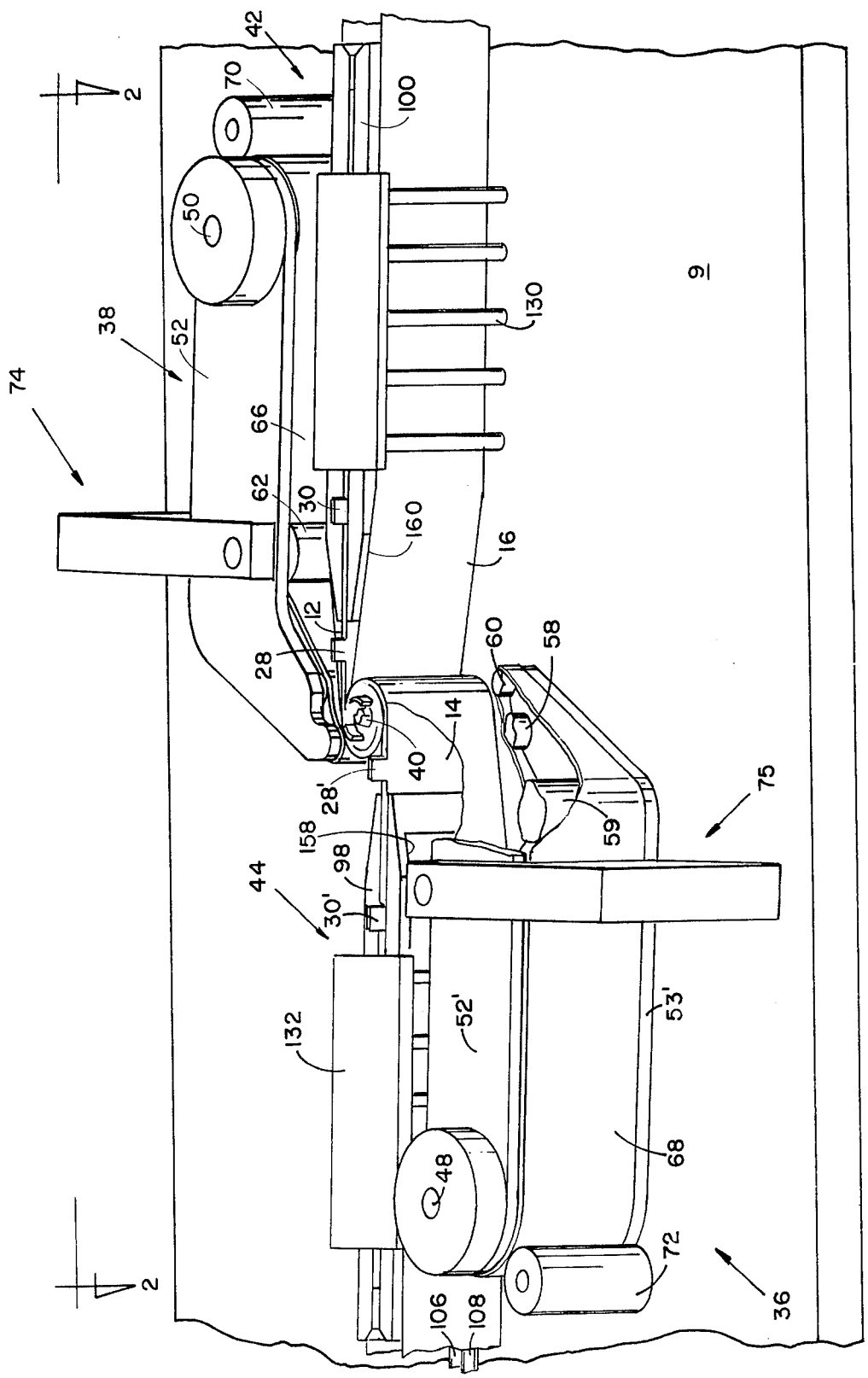
FIG. 1 is a perspective view of a portion of the winding apparatus as it is winding cell component in spiral form.
Figure 2:
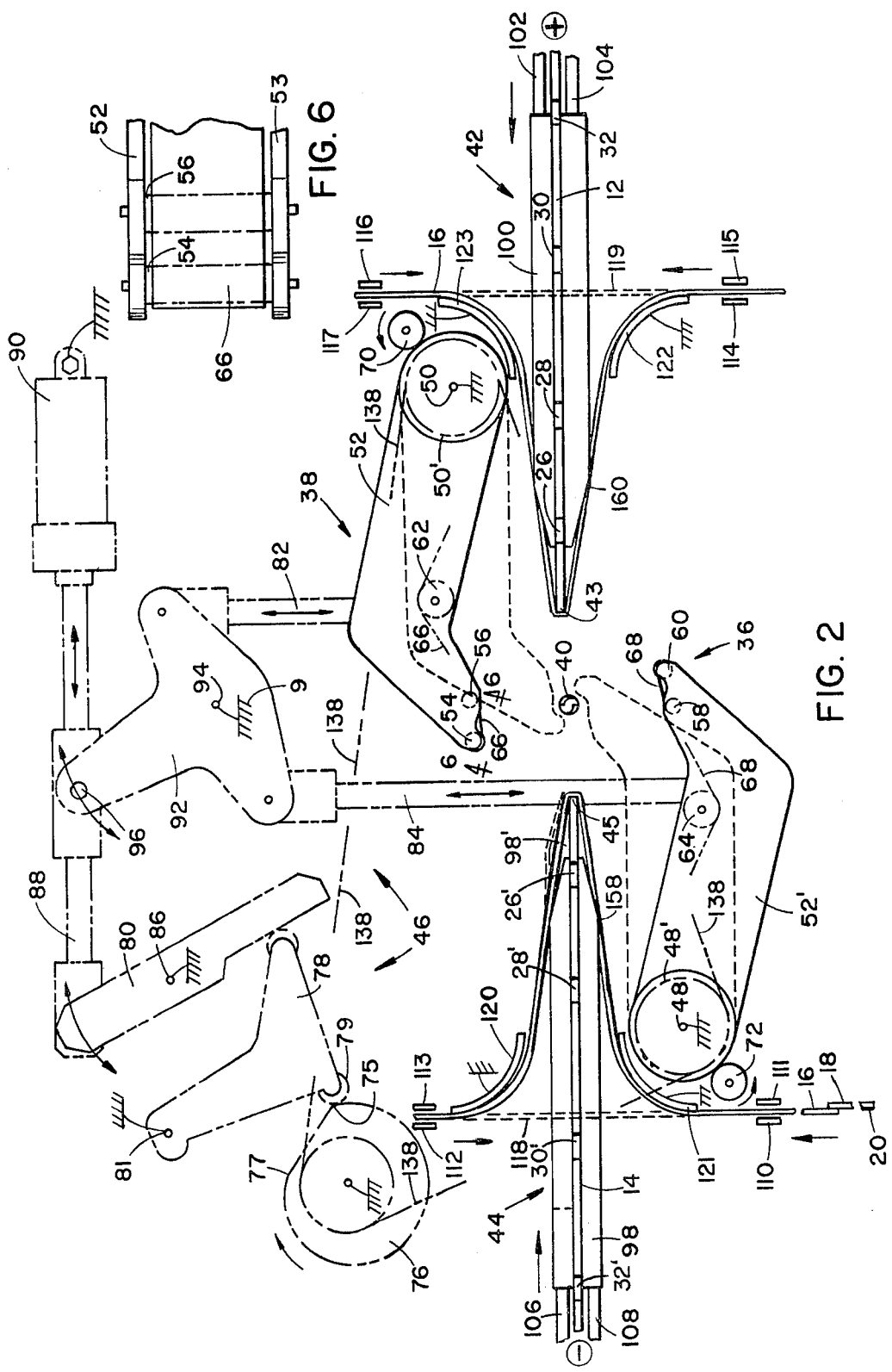
FIG. 2 is a top plan, schematic view of the winding apparatus generally viewed along lines 2—2 of FIG. 1.

Referring to FIGS. 1 and 2 of the drawings, the winder mechanism includes dual winding heads 36, 38, a free turning mandrel 40 disposed between the winding heads, a first cell plate feeder 42, a second cell plate feeder 44 and a mechanical drive mechanism 46 linked to each of the juxtaposed winding heads 36, 38 for retracting the heads away from each other to the position shown in solid lines in FIG. 2, or movable toward each other to the position shown in phantom. The winding mechanism is mounted on frame 9, shown schematically throughout FIG. 2, with the mechanical drive linkage 46 being mounted along the undersurface of the frame. The winding heads are pivotable about hubs 48, 50. The movement of the winding heads is generally along center line X—X shown in FIGS. 3 and 4. In this embodiment center line X—X will pivot clockwise as the elements are wound because of the rotative movement of the winding heads. Alternatively, the winding heads could move on a straight line normal to the initial plate feed direction if the winding heads were mounted for rectilinear movement. In either case, this center line also pierces the intermediately disposed mandrel 40, about which the cell components are wound.

Figure 9:
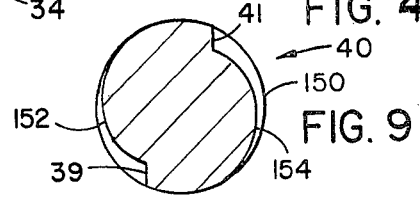
FIG. 9 is a cross section of the preferred winding mandrel of the invention.

While it is contemplated that there may be other types of mandrels which may be employed to wind a spiral cell pack according to the invention, it has been found that the particular design shown in horizontal section in FIG. 9 is highly preferable since the resulting cell pack is of the desired predetermined dimension, no foldbacks or stress points are produced during wind, and the occurrence of "no-winds" is virtually eliminated. Referring to that figure, the mandrel 40 consists of a generally circular base shaft 150, mountable for free turning, and an upper winding portion comprised of a pair of inwardly angled notched lands 39, 41, which receive the leading edges of the cell pack to be wound, and from which project juxtaposed major edge surfaces 152, 154, defined by a generally spiralled curvature. The spiral starts at the inward extent of one land and continues until terminating approximately at the outer edge of the opposite land. The depth of the notches of the lands may be equal to from about one-half (as shown) up to the full combined equivalent thickness of the appropriate plate and its adjacent separator layers.

The winding heads each comprise upper plate 52, 52' and lower plate 53, 53' mounted to the hubs. Mounted between the upper and lower plates and at the winding end of each of the heads is a pair of free turning pressure rolls 54, 56 and 58, 60 laterally straddling the winding head center line. There is also disposed between the upper and lower plates tension roller 62, 64, and other free turning rollers (e.g., 59) disposed about the perimeter of the winding heads, about which along with the pressure rolls 54, 56 and 58, 60 is trained a flexible endless belt driving surface 66, 68. The belts are driven with driven rollers (shown hidden at 48', 50' coaxially mounted with hubs 48, 50) at least one (and preferably both) of which is driven, and the desired tension on the belt is obtained by adjusting the position of the tension roller 62, 64 with the spring biased adjusting mechanism 74, 75 attached to the upper plates of the winding heads. The belts are preferably essentially nonextensible. Pinch roll 70, 72 are employed to ensure positive driving of the belt without slippage.

Each of the pairs of pressure rollers 54, 56 and 58, 60 are offset with respect to one another and the lines connecting each of the roller pair centers are non-parallel with respect to the direction of plate feed, as shown particularly in FIGS. 3 and 4, the importance of which will be described more fully hereafter.

The winding heads 36, 38 may be retracted relative to one another in any desired fashion, however, to produce a wound cell pack element having the preferred predetermined geometrical cross section as shown in FIG. 8, it is necessary to provide a retracting mechanism which will withdraw the winding heads away from each other during winding at a predetermined programmed rate relative to the rate at which the winding belts are driven. One such mechanism is shown generally at 46, and includes cam surface 76, whose shape will be determined by the desired geometrical cross section of the cell pack to be wound, and a linkage which translates the cam shape directly into a corresponding retractive movement of the winding heads by rods 82, 84 pin connected (not shown) to the lower plates 53, 53' of the winding heads. This linkage includes a cam follower 78 pivotable about point 81. The cam follower is connected to link 80 pivotable about center 86 (which is preferably adjustably locatable), the link being connected to one end of an adjustable rod 88 connected to a fixedly mounted piston cylinder 90 for movement as shown by the arrows in FIG. 2. Bell crank 92, pivotal about pivot 94, translates the motion of rod 88 through the pin connection 96. The rocking motion of the belt crank is converted to linear reciprocal motion of the pinned rods 82, 84 which determine the respective movement of the winding heads.

The rotational speed of the winding belts 66, 68 is directly proportional to the linear speeds of the connecting rods 82, 84. This is accomplished in the preferred mode by a positive drive belt 138 (partially shown) connecting cam 76, drive roller 48' and drive roller 50' along the undersurface of the frame 9 for synchronous rotation.

The plate and separator feeders 42, 44 include bifurcated plate guides 98, 100 which, respectively, straddle each of the negative 14 and positive 12 electrode plates. Each of the halves of the bifurcated guides may be spread apart to load and unload the plates. Each of the guides are slidably movable toward and away from the winding area on tracks 102, 104 and 106, 108. Each of the guides 42, 44 are pivotal about a point (not shown) near their trailing end, so that the guides automatically pivot through an angle similar to each of the winding heads 36, 38 to insure that the components are fed substantially tangentially to the winding cell pack. The component feed angle with respect to axis X—X should be 90° (tangential) or less to prevent component stretching.

As an additional alternative one or both of the halves of each of the guides may preferably act as a forwardly (and retractably rearwardly) movable tuck blade, movable to the position shown in phantom at 98' of FIG. 2, to assist in picking up the separator and delivering it to the winding area while protecting the associated plate from being misaligned.

The separator material 16 is initially positioned loosely within a set of guides, a portion of which are shown at 110–117 (FIG. 2 only) which hold the separator generally transversely of the direction of plate feed, as shown in phantom at 118, 119. Further separator guide means are provided by lead-in curves 120–123, overhanging ledges e.g., 158, 160 of the plate guides or alternatively the upstanding straddling guides 130, 132 (FIG. 1 only), which come into play as the plates are fed into the winding area.

(3) Method of Winding

Preparatory to winding, the machine is at rest and the winding heads 38 and 36 are in their retracted position as shown in solid lines in FIG. 2. Air cylinder 90 has been actuated to maintain rod 88 at its proper throw to insure that the winding heads are fully retracted and out of the way of the incoming plate feeding mechanism.

Initially the positive plate feeder 42 and plate leading edge 43 are to the right of the plane defined by the initial position of the separator along line 119. Similarly, the negative plate feeder 44 is retracted to the left of line 118. Separator material in the form of single or multiple layers is now inserted between guides 110–117 and disposed transversely to the plate feeding mechanism, along planes 118, 119. As will be noted, tail 18, which has been cut to length, is attached to one of the separators 16 and includes double-backed adhesive 20 for adhering to itself once the components are fully wound.

In the next step, each of the plate feeding mechanisms 42, 44 are advanced along their respective tracks toward the winding area, and in so doing the leading edges 43 and 45 of the plates (or the forwardly extending tuck blades 98') which are less pliant than the separator material, pick up their respective separators 16 and carry them along with the plates without relative slipping. Plate feeder 42 is directed to one side (i.e., the top side) of the mandrel 40 while the other plate is directed toward the opposite side of the mandrel 40. The leading edges 43, 45 of the plates are advanced approximately to a position even with the far end of the mandrel and opposite the receptive grooves 39, 41 formed therein. Up to this point, the plates are physically separated from the adjacent carried separators, except for point contact at ends 43 and 45, and no contact has been made with the mandrel or winding belts.

The winding heads 38 and 36 are now locked into position preparatory to winding, as shown in FIG. 3. This is accomplished by rotation of cam 76 clockwise until point 77 on the surface of the cam is opposite roller 79 of cam follower 78. Air cylinder 90 is actuated so that rod 88 moves rightwardly, cam follower 78 engages the cam at point 77, and non-moving belt surfaces 66 and 68 of the winding heads engage the separators and sandwiched plates and press them against the mandrel.

With the winding heads locked into place as shown in FIG. 3, the winding belts in the area intermediate each of rollers 54, 56 and 58, 60 take on a significant curvature due to their flexibility and compression against the sandwiched plates and separators. The amount of curvature is regulated by the tension rollers 62, 64 and associated tensioning devices 74, 75. This curvature of the belts in turn makes the leading edge of the plates 43 and 45 take an arcuate set. This initial arcute set is believed to be critical during initiation of the winding process to insure that the desired spiral configuration is obtained. The slots or lands 39, 41 in the S-shaped mandrel, assist in formation of this arcute set and provide a smooth continuous surface flush with the mandrel curvature for improved spiral mating of the sandwiched plates with one another during winding start up.

The plates and separators are being fed tangentially to the mandrel without coming into contact with one another substantially until the point of contact tangentially with the mandrel, and then with winds of the cell pack as winding proceeds.

With the leading edge of the cell plates and adjacently disposed separator formed about the mandrel as shown in FIG. 3, the winding belts 66 and 68 are then driven by actuation of drive rollers 48' and 50' (in turn driven by belt 138), in synchronization with rotation of cam 76. As the winding belts are driven, the mechanical linkage operatively connected to cam 76 causes the winding heads to retract essentially along the variable center line X—X. The components spirally wind upon each other since the plates and separators are freely and loosely disposed within their guides and the guides are progressively pivoted away from the mandrel so that the components are fed substantially in a straight line tangential to the winding cell pack. The predetermined programmed rate of withdrawal of the winding heads together with the desired tensioning maintained by the belt driving surfaces and directly supported by the rollers causes the cell pack to be spirally wound in predetermined fashion so that its final outside "diameter", or any other diameter, for instance *ab* and *cd* shown in FIG. 8, are of predetermined dimension. This dimensioning will be maintained since the winder automatically compensates for variations in component thicknesses by compressing the separator the necessary amount throughout the wind. Furthermore, this programmed geometrical winding automatically lines up the positive and negative tabs, as shown in FIGS. 4 and 8.

It will be noted that throughout the period of wind the driving belts 66 and 68 are making total vertical contact with the cell and touch the outer separator layers and not the sticky or tacky electrode plates. The belts are at least partially deflected throughout the wind, producing a curved portion between rollers 54, 56 and 58, 60 and therefor offer a large contact area for winding. Since there are two winding heads, each preferably driven, each plate is essentially driven independently (although synchronously) of the other plate, and a very balanced winding system is provided in which the components are tensioned uniformly during the wind yet permitted limited differential slipping.

An important feature which ensures obtaining a cell pack of controlled diameter is the positioning of the roller pairs 54, 56 and 58, 60. During the entire winding operation at least one or both of the individual rollers of each of these roller pairs apply direct pressure (through the interposed belt) against the separators and plates being wound, permitting accurate mechanical control of plate spacing and final cell diameter.

At the end of the wind cam 76 has moved clockwise from point 77 to point 75, at which time the winding heads 36, 38 are stationary and the plates and separators have been fully wound up in spiral form with the tail member 18 fully circumscribing the cell and self-adhered to itself. The tail 18 acts as a retainer for the wound element, preventing unwinding. In the final step, the winding heads are retracted still further to the initial position shown in solid lines in FIG. 2, with the aid of air cylinder 90. The spirally wound element is then ejected or removed from the mandrel upwardly (a conventional ejection mechanism may be employed, or it may be done manually) and the machine, upon retracting the plate guide elements 42 and 44, is ready to start the next winding cycle.

The wound element, as shown in FIG. 8, is extremely uniform with essentially equal spacing between the plates throughout the radial extent of the spiral. The mutual stacking compression between the elements may vary somewhat, according to the thicknesses of the components wound, although the tension will be maintained within a desired range, particularly with the aid of tension rollers 62 and 64 of the winding heads. The finished cell, as aforementioned, will have a cross section of a predetermined, programmed geometry since the winder will compensate for differences in component thicknesses. Moreover, since the plates and separators do not actually come into interfacial contact until the point of wind is encountered, the components will be permitted to slip relative to one another as the spiral is formed, and thus overcome the problems characteristic of many prior art winders.

(4) Modifications of the Invention

It will be understood that the invention is capable of a variety of modifications and variations which will become apparent to those skilled in the art upon a reading of the specification, such modifications intended to be part of the invention as defined in the appended claims.

What is claimed is:

1. A spirally wound element of nominal design outside diameter for use in an electrochemical cell comprising:

positive and negative flexible electrode plates interleaved with compressible separator layers, having a combined uncompressed nominal design thickness, the unwound and uncompressed thickness of the plates and separators combined being greater than one but less than about three percent away from the predetermined nominal design thickness;

the outside diameter of the spirally wound element, in which the separator layers are compressed to a reduced thickness, characterized by having a predetermined dimension within plus or minus one percent of the nominal design outside diameter.

2. The spirally wound element of claim 1 further comprising a tail wrap member wound circumferentially about the outside of the wound element and adhered to itself to constrict the wound element to its wound dimension.

3. The spirally wound element of claim 1 wherein the unwound and uncompressed thickness of the plates and separators combined is in the range between two and three percent oversized or undersized, relative to the predetermined nominal design thickness.

4. A spirally wound plate/separator subassembly of a given nominal design outside diameter for use in an electrochemical cell comprising:

positive and negative electrode plates and interleaved compressible separator, having a combined uncompressed nominal design thickness, spirally wound sufficiently tightly into a cylindrical element so that the separator is compressed;

the spirally wound element having an outside diameter whose dimension percentagewise departs less from its nominal design outside diameter than the combined unwound and uncompressed thickness of the plates and separators departs from its nominal design thickness.

5. The subassembly of claim 4 wherein the positive and negative plates are substantially equally spaced apart throughout the cross section of the spirally wound element.

6. A cylindrical spirally wound lead-acid cell comprising the subassembly of claim 5 fitted within a cylindrical container.

7. The subassembly of claim 4 wherein each plate carries at least three protruding tabs which are aligned along a radius of the cylindrical spirally wound element, and wherein the radially innermost tab and outermost tab protrude higher than the tab or tabs situated intermediate such innermost and outermost tabs.

8. A mechanically controlled dual head belt-wound electrode/separator spiral subassembly of nominal design outside diameter for use in electrochemical cells comprising:

positive and negative flexible electrode plates interleaved with compressible separator layers, having a combined uncompressed nominal design thickness, the unwound and uncompressed thickness of the plates and separators combined being greater than one but less than about three percent away from the predetermined nominal design thickness;

the outside diameter of the spirally wound element in which the separator layers are compressed to a reduced thickness, characterized by having a predetermined dimension within plus or minus one percent of the nominal design outside diameter.

9. A cam controlled belt-wound spiral electrode plate/separator subassembly of nominal design outside diameter for use in electrochemical cells comprising:

positive and negative electrode plates and interleaved compressible separator, having a combined uncompressed nominal design thickness, spirally wound sufficiently tightly into a generally cylindrical element so that the separator is compressed;

the spirally wound element having an outside diameter whose dimension percentagewise departs less from its nominal design outside diameter than the combined unwound and uncompressed thickness of the plates and separators departs from its nominal design thickness.

* * * * *